United States Patent
Kurashige (10) Patent No.: US 9,964,845 B2
(45) Date of Patent: May 8, 2018

(54) PROJECTION APPARATUS AND ILLUMINATION APPARATUS

(71) Applicant: Dai Nippon Printing Co., Ltd., Tokyo (JP)

(72) Inventor: Makio Kurashige, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days. days.

(21) Appl. No.: 15/327,798

(22) PCT Filed: Jul. 17, 2015

(86) PCT No.: PCT/JP2015/070589
§ 371 (c)(1),
(2) Date: Jan. 20, 2017

(87) PCT Pub. No.: WO2016/013524
PCT Pub. Date: Jan. 28, 2016

(65) Prior Publication Data
US 2017/0212416 A1    Jul. 27, 2017

(30) Foreign Application Priority Data

Jul. 23, 2014    (JP) ................. 2014-149966

(51) Int. Cl.
| | |
|---|---|
| G03B 33/12 | (2006.01) |
| G03B 21/00 | (2006.01) |
| G03B 21/20 | (2006.01) |
| G02B 27/48 | (2006.01) |
| F21V 5/00 | (2018.01) |
| F21V 14/04 | (2006.01) |
| F21V 9/16 | (2006.01) |

(52) U.S. Cl.
CPC .............. *G03B 33/12* (2013.01); *F21V 5/007* (2013.01); *F21V 5/008* (2013.01); *F21V 9/16* (2013.01);
(Continued)

(58) Field of Classification Search
CPC .... G03B 21/28; G03B 21/204; G03B 21/208; G03B 21/2013; G03B 21/2066;
(Continued)

(56) References Cited

U.S. PATENT DOCUMENTS 8,992,029 B2    3/2015   Taniguchi et al.
2010/0296065 A1   11/2010   Silverstein et al.
(Continued)

FOREIGN PATENT DOCUMENTS

JP    2008-224760 A1    9/2008
JP    2012-103615 A1    5/2012
(Continued)

OTHER PUBLICATIONS

International Search Report and Written Opinion (Application No. PCT/JP2015/070589) dated Oct. 20, 2015.
(Continued)

*Primary Examiner* — Sultan Chowdhury
(74) *Attorney, Agent, or Firm* — Burr & Brown, PLLC (57) ABSTRACT

A projection apparatus is provided with an optical device to diffuse a coherent light beam, an irradiation unit to irradiate a coherent light beam to the optical device, a color generator to perform wavelength conversion of and transmission of light beams in a first illumination zone, in a time division manner, at least one relay optical system to change a travel direction of the wavelength-converted light beam and a travel direction of a light beam to generate an illumination light beam which illuminates a second illumination zone, a spatial light modulator to generate a modulated image to the second illumination zone, and a projection optical system. The first illumination zone and the second illumination zone have a conjugate relationship. The color generator has a transmission portion to transmit the diffused coherent light beam, without diffusing the diffused coherent light beam.

10 Claims, 8 Drawing Sheets

(52) U.S. Cl.
CPC .............. *F21V 14/04* (2013.01); *G02B 27/48* (2013.01); *G03B 21/005* (2013.01); *G03B 21/204* (2013.01); *G03B 21/208* (2013.01); *G03B 21/2066* (2013.01)

(58) Field of Classification Search
CPC .. H04N 9/3111; H04N 9/3114; H04N 9/3158; H04N 9/3161; H04N 9/3164
See application file for complete search history.

(56) References Cited

U.S. PATENT DOCUMENTS

| | | | |
|---|---|---|---|
| 2010/0328632 A1 | 12/2010 | Kurosaki et al. | |
| 2012/0300178 A1* | 11/2012 | Sugiyama | H04N 9/3111 353/31 |
| 2014/0125956 A1 | 5/2014 | Chifu et al. | |
| 2014/0211169 A1* | 7/2014 | Kitano | G03B 21/204 353/31 |

FOREIGN PATENT DOCUMENTS

| | | |
|---|---|---|
| JP | 2012-237813 A | 12/2012 |
| JP | 2014-021223 A | 2/2014 |

OTHER PUBLICATIONS

Extended European Search Report, European Application No. 15824131.5, dated Nov. 27, 2017 (8 pages).

* cited by examiner

PROJECTION APPARATUS AND ILLUMINATION APPARATUS

BACKGROUND OF THE INVENTION

Field of the Invention

The present disclosure relates to a projection apparatus and an illumination apparatus that use a coherent light beam as a light source.

Description of Related Art

It is a known technique to make a laser beam from a laser light source incident on a fluorescent layer on a rotary wheel to excite the fluorescent layer to generate a light beam in another wavelength range to be used as a light source beam for a projector (Japanese Patent Laid-Open No. 2012-103615). In the technique disclosed in the publication, when a high-power laser beam is irradiated to the fluorescent layer, problems occur such that the fluorescent layer is damaged and emission efficiency of the fluorescent layer is lowered. Therefore, after the laser beam is uniformized by an optical diffusion member, the laser beam is incident on the rotary wheel.

SUMMARY OF THE INVENTION

However, the optical diffusion member of the publication is a transparent resin flat member containing scattering particles. Part of laser beams diffused by the flat member is not incident on the rotary wheel, so that light utilization efficiency is lowered.

Moreover, in the above-described publication, a light beam excited by the fluorescent layer of the rotary wheel is uniformized by a collimated optical system, a lens array, etc. By the uniformizing process, light utilization efficiency is further lowered.

When uniformizing optical systems are provided before and after the rotary wheel as described in the publication, the configuration of the optical system becomes complicated and thus it may become difficult to make the projector in a compact size and at low cost.

The present disclosure is made to solve the problems discussed above and its purpose is to provide a projection apparatus and an illumination apparatus, capable of simplifying the configuration of an optical system and improving utilization efficiency of a coherent light beam.

In order to solve the above problems, according to an aspect of the present disclosure, there is provided a projection apparatus comprising:

an optical device to diffuse a coherent light beam;

an irradiation unit to irradiate a coherent light beam to the optical device so that the coherent light beam scans on the optical device;

a color generator to perform wavelength conversion of and transmission of light beams in a first illumination zone illuminated with the coherent light beam diffused by the optical device, in a time division manner;

at least one relay optical system to change a travel direction of a light beam wavelength-converted by the color generator and a travel direction of a light beam that has transmitted the color generator to generate an illumination light beam which illuminates a second illumination zone;

a spatial light modulator to generate a modulated image based on the illumination light beam to the second illumination zone; and a projection optical system to project the modulated image generated by the spatial light modulator onto a diffusing plane, wherein the first illumination zone and the second illumination zone have a conjugate relationship with each other, and the color generator comprises:

a fluorescent portion to be excited by the coherent light beam diffused by the optical device to generate a light beam in a wavelength range different from a wavelength range of the light beam diffused by the optical device; and a transmission portion to transmit the coherent light beam diffused by the optical device, without diffusing the coherent light beam diffused by the optical device, wherein the color generator cyclically switches whether the coherent light beam diffused by the optical device is incident on the fluorescent portion or on the transmission portion.

The color generator may reflect the light beam that the fluorescent portion has generated by wavelength conversion in a direction of the optical device, the projection apparatus may further comprising:

a color separation optical system provided in an optical path between the optical device and the color generator, to guide the coherent light beam diffused by the optical device to the color generator and to guide a light beam reflected by the fluorescent portion in a direction different from the direction of the optical device.

The color generator may transmit the light beam that the fluorescent portion has generated by wavelength conversion incident on the relay optical system, together with a light beam that has transmitted the transmission portion.

The color generator may be a rotary member rotatable about a rotation axis, the rotary member having the fluorescent portion and the transmission portion arranged in a circumferential direction.

The irradiation unit may irradiate a coherent light beam in a single wavelength range to the optical device, wherein the fluorescent portion may be excited by the coherent light beam diffused by the optical device to generate light beams in two different kinds of wavelength ranges.

The irradiation unit may irradiate two kinds of coherent light beams in different wavelength ranges to the optical device, wherein the fluorescent portion may be excited by one of the two kinds of coherent light beams to generate a light beam in a wavelength range different from the wavelength ranges of the two kinds of coherent light beams.

Based on a light beam wavelength-converted by the color generator and a light beam that has transmitted the color generator, the relay optical system may generate a third illumination zone in an optical path between the first illumination zone and the second illumination zone and change a travel direction of an illumination light beam to the third illumination zone to generate an illumination light beam to the second illumination zone.

The projection apparatus may further comprise a color composite optical system to combine the light beam wavelength-converted by the color generator and the light beam that has transmitted the color generator to generate an illumination light beam to the third illumination zone.

The spatial light modulator may comprise a plurality of spatial light modulating units to generate different modulated images by using light beams in different wavelength ranges, wherein the relay optical system may illuminate a plurality of the second illumination zones associated with the plurality of spatial light modulating units, respectively.

According to another aspect of the present disclosure, there is provided an illumination apparatus comprising:

an optical device to diffuse a coherent light beam;

an irradiation unit to irradiate a coherent light beam to the optical device so that the coherent light beam scans on the optical device;

a color generator to perform wavelength conversion of and transmission of a light beam in a first illumination zone illuminated with the coherent light beam diffused by the optical device, in a time division manner; and at least one relay optical system to change a travel direction of a light beam wavelength-converted by the color generator and a travel direction of a light beam that has transmitted the color generator to generate an illumination light beam which illuminates a second illumination zone;

wherein the first illumination zone and the second illumination zone have a conjugate relationship with each other, and the color generator comprises:

a fluorescent portion to be excited by the coherent light beam diffused by the optical device to generate a light beam in a wavelength range different from a wavelength range of the light beam diffused by the optical device; and a transmission portion to transmit the coherent light beam diffused by the optical device, without diffusing the coherent light beam diffused by the optical device, wherein the color generator cyclically switches whether the coherent light beam diffused by the optical device is incident on the fluorescent portion or on the transmission portion.

According to the present disclosure, the configuration of an optical system can be simplified and utilization efficiency of a coherent light beam can be improved.

DETAILED DESCRIPTION OF THE INVENTION

Hereinafter, embodiments of the present disclosure will be explained with reference to the drawings. In the accompanying drawings of the present specification, for simplicity of drawings and easy understanding, the scale, the ratio of height to width, etc. are appropriately modified or enlarged from actual ones.

First Embodiment

Figure 1:
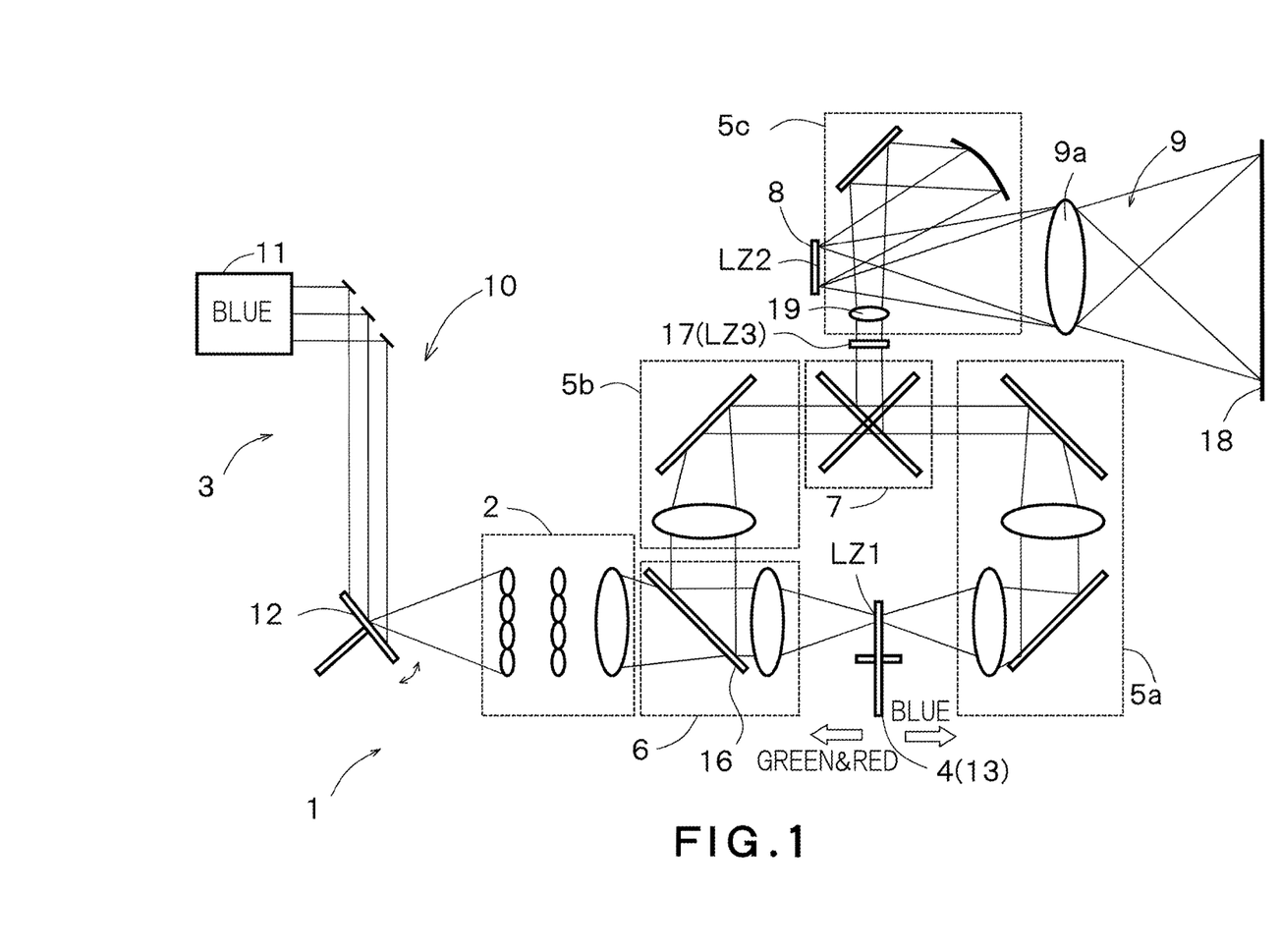
FIG. 1 is a diagram showing the configuration of an optical system of a projection apparatus 1 according to a first embodiment of the present disclosure.

FIG. 1 is a diagram showing the configuration of an optical system of a projection apparatus 1 according to a first embodiment of the present disclosure. FIG. 1 shows major optical members of the projection apparatus 1, and thus optical members not shown may be present in the projection apparatus 1.

The projection apparatus 1 of FIG. 1 is provided with an optical device 2, an irradiation unit 3, a color generator 4, a relay optical system 5, a color separation optical system 6, a color composite optical system 7, a spatial light modulator 8, and a projection optical system 9. Among them, the optical device 2 and the irradiation unit 3 are major parts of an illumination apparatus 10.

The optical device 2 diffuses a coherent light beam from the irradiation unit 3. The optical device 2 may, for example, have a hologram recording medium, not shown, recorded with diffraction fringes that can reproduce an image of a scattering plate, or have a lens array. In the present embodiment, an example of the optical device 2 using the lens array will be explained. The detailed configuration of the optical device 2 in this case will be described later.

The irradiation unit 3 has a laser source 11 that irradiates a coherent light beam in a specific wavelength range and an optical scanning device 12 that makes the coherent light beam irradiated from the laser source 11 scan on the optical device 2.

The reasons why the laser source 11 is utilized are that the laser source 11 has a long life compared to other light sources, the maintenance cost is low, the light source itself can be made in a compact size, and since the coherent light beam is excellent in straightness, light utilization efficiency can be improved. The present embodiment uses a laser source 11 that irradiates a coherent light beam in a wavelength range of blue. Since only a single laser source 11 may not give a sufficient light intensity, a laser unit having a plurality of laser sources 11 that irradiate coherent light beams in the wavelength range of blue may be provided.

The optical scanning device 12 varies a reflection angle of the coherent light beam from the laser source 11 at a constant interval to make a reflected coherent light beam scan on the optical device 2. In this way, coherent light beams diffused by the optical device 2 are incident on the color generator 4 which will be described later at incidence angles different in time. As a result, speckle patterns having no correlations are superimposed on the color generator 4, and thus the speckle becomes inconspicuous.

The optical scanning device 12 vibrates a mirror member irradiated with the coherent light beam from the laser source 11 by an MEMS (Micro Electro Mechanical Systems) or the like, or rotates the mirror member by a motor, to vary the reflection angle of the coherent light beam irradiated to the mirror member in one- or two-dimensional direction.

In the present embodiment, a uniform light area to be formed on the color generator 4 by the optical device 2 is referred to as a first illumination zone LZ1. As described above, the incidence angle of a coherent light beam incident on the first illumination zone LZ1 is varying with time, so that a speckle pattern is inconspicuous in the first illumination zone LZ1.

The first illumination zone LZ1 has a conjugate relationship with a second illumination zone LZ2 that is disposed to overlap with the spatial light modulator 8, which will described later. In other words, the first illumination zone LZ1 and the second illumination zone LZ2 have similar figures. Therefore, a coherent light beam to be used for illuminating the first illumination zone LZ1 is also used for illuminating the second illumination zone LZ2 through the relay optical system 5, to improve light utilization efficiency. When designing the optical system of the projection apparatus 1 of FIG. 1, the optical members are arranged so that the first illumination zone LZ1 that is formed on the color generator 4 and the second illumination zone LZ2 that is disposed to overlap with the spatial light modulator 8 have a conjugate relationship with each other.

The color generator 4 performs wavelength conversion of and transmission of a light beam in the first illumination zone LZ1 illuminated with the coherent light beam diffused by the optical device 2, in a time division manner. In FIG. 1, as a concrete example of the color generator 4, a rotary wheel 13 is used.

Figure 2:
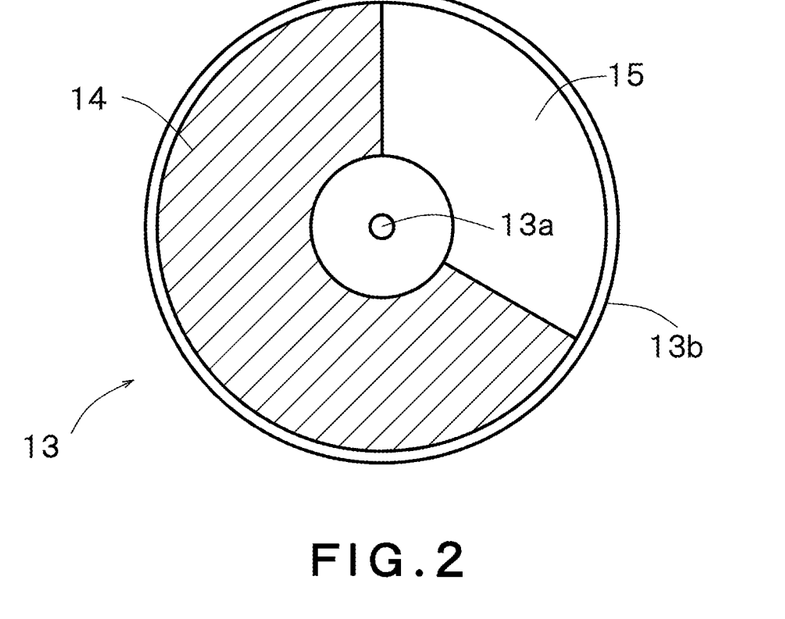
FIG. 2 is a plan view of a rotary wheel 13 according to the first embodiment.

FIG. 2 is a plan view of the rotary wheel 13. The rotary wheel 13 of FIG. 2 has a disk 13b rotatable about a rotary shat 13a disposed on the center. The surface of the disk 13b in the circumferential direction is provided with a fluorescent portion 14 and a transmission portion 15. The fluorescent portion 14 is excited by the coherent light beam diffused by the optical device 2 to generate a light beam in a wavelength range different from that of the coherent light beam. The transmission portion 15 transmits the coherent light beam diffused by the optical device 2, without diffusing the coherent light beam. By rotation of the rotary wheel 13, incidence of the coherent light beam diffused by the optical device 2 on the fluorescent portion 14 and on the transmission portion 15 can be cyclically switched.

A conventional rotary wheel 13 is provided with a diffusion layer, such as frosted glass, in the case of transmitting a coherent light beam irradiated to the rotary wheel 13, to intentionally diffuse the coherent light beam. This is performed in order to make speckles inconspicuous by diffusing the coherent light beam by the diffusion layer. Different from this, in the present embodiment, as described above, an anti-speckle measure is performed at the front side of the rotary wheel 13 to make speckles inconspicuous in the first illumination zone LZ1 on the rotary wheel 13, hence a diffusion layer, such as frosted glass, is not required. Therefore, in the present embodiment, the transmission portion 15 is provided in the circumferential direction of the rotary wheel 13. The transmission portion 15 transmits a coherent light beam from the optical device 2 as it is, so that light utilization efficiency is improved with no loss of light, compared to the case where a diffusion layer, such as frosted glass, is provided.

The fluorescent portion 14 on the rotary wheel 13 is excited by a coherent light beam in a wavelength range of blue to generate coherent light beams in wavelength ranges of red and green. The coherent light beams in the wavelength ranges of red and green generated by the fluorescent portion 14 are emitted toward an incidence direction of the coherent light beam from the optical device 2. In other words, the coherent light beams of red and green are reflected by the rotary wheel 13 to be emitted therefrom while the coherent light beam of blue transmits the rotary wheel 13 to be emitted therefrom.

The relay optical system 5 changes travel directions of the light beams that are wavelength-converted by the color generator 4 and of the light beam that transmits the color generator 4 to generate an illumination light beam for illuminating the second illumination zone LZ2.

The relay optical system 5 can be configured by combining some different relay optical systems. In FIG. 1, the relay optical system 5 has a first relay optical system 5a to change the travel direction of the blue coherent light beam that has transmitted the rotary wheel 13 that is the color generator 4, a second relay optical system 5b to change the travel direction of the red and green coherent light beams that have been wavelength-converted by the rotary wheel 13, and a third relay optical system 5c to generate an illumination light beam for illuminating the second illumination zone LZ2 from an intermediate image which will be described later.

The first to third relay optical systems 5a to 5c each include a mirror for reflecting an incident light beam and a convex lens for collecting incident light beams, however, may include other optical members, such as, a uniformizing optical system for uniformizing a light beam.

The color separation optical system 6 has a dichroic mirror 16. The dichroic mirror 16 is formed with a dielectric multilayer film that has wavelength selectivity to guide the coherent light beam from the optical device 2 to the rotary wheel 13 and to change the travel direction by 90° of the red and green coherent light beams reflected by the rotary wheel 13.

The second relay optical system 5b switches the travel direction of the red and green coherent light beams separated by the dichroic mirror 16.

The blue coherent light beam that has transmitted the first relay optical system 5a, and the red and green coherent light beams that have transmitted the second relay optical system 5b are combined by the color composite optical system 7 to be an illumination light beam for illuminating a third illumination zone LZ3. The third illumination zone LZ3 is an area where an intermediate image 17 is formed, which is not the place where the spatial light modulator 8 is disposed. It is an option, not indispensable, to provide the intermediate image 17 or not. In other words, the spatial light modulator 8 may be disposed on the position of the third illumination zone LZ3.

The illumination light beam to the third illumination zone LZ3 located on the position of the intermediate image 17 is incident on the third relay optical system 5c to change its light travel direction, which finally generates an illumination light beam for illuminating the second illumination zone LZ2.

As described above, since the second illumination zone LZ2 is disposed to overlap with the spatial light modulator 8, the spatial light modulator 8 receives the illumination light beam to the second illumination zone LZ2 to generate a modulated image. The modulated image is projected onto a diffusing screen 18 via a projection lens 9a of the projection optical system 9.

As the spatial light modulator 8, for example, a transmission-type liquid crystal microdisplay, such as LCOS (Liquid Crystal on Silicon), can be used. In this case, the liquid crystal microdisplay illuminated by the illumination apparatus 10 in the plane direction selects a coherent light beam per pixel to transmit the selected coherent light beam, so that a modulated image is formed on the liquid crystal microdisplay. The modulated image, i.e. an image light beam obtained in this way is varied its size by the projection optical system 9, as required, and projected onto the diffusing screen 18. The speckle pattern of the modulated image projected onto the diffusing screen 18 varies with time, so that speckles become inconspicuous.

Or, as the spatial light modulator 8, a reflection-type microdisplay can also be used. In this case, a modulated image is generated by a reflected light beam at the spatial light modulator 8 so that a plane on the spatial light modulator 8 illuminated with the coherent light beam from the illumination apparatus 10 and an emitting plane for an image light, i.e. a reflected light beam, of a modulated image generated by the spatial light modulator 8 become the same plane. When utilizing such a reflected light beam, it is possible to use a MEMS (Micro Electro Mechanical Systems) device such as a DMD (Digital Micromirror Device) as the spatial light modulator 8. In the apparatus disclosed in Japanese Patent Laid-Open No. 2008-224760, the DMD is used as the spatial light modulator 8.

Moreover, it is preferable that the incidence plane of the spatial light modulator 8 has the same shape and size as the second illumination zone LZ2. In this case, the coherent light beam from the laser source 11 can be used for displaying an image on the diffusing screen 18 at high utilization efficiency.

The exit pupil of a lens 19 positioned in the vicinity of the intermediate image 17 described above has a conjugate relationship with the entrance pupil of the projection lens 9a in the projection optical system 9. With this relationship, the intermediate image 17 that has transmitted the exit pupil of the lens 19 is projected onto the diffusing screen 18 via the projection lens 9a. The diffusing screen 18 may be a transmission type or a reflection type.

As described above, in the present embodiment, the optical scanning device 12 provided in the irradiation unit 3 makes a coherent light beam scan on the optical device 2. Therefore, speckles generated on the diffusing screen 18 are superimposed and averaged, so that the speckles generated on the diffusing screen 18 become inconspicuous.

As explained in another embodiment which will be described later, in the configuration of FIG. 1, the color composite optical system 7 is not an essential one and it is not required to provide a plurality of relay optical systems 5. Moreover, as described above, the intermediate image 17 may not be formed.

Figure 3:
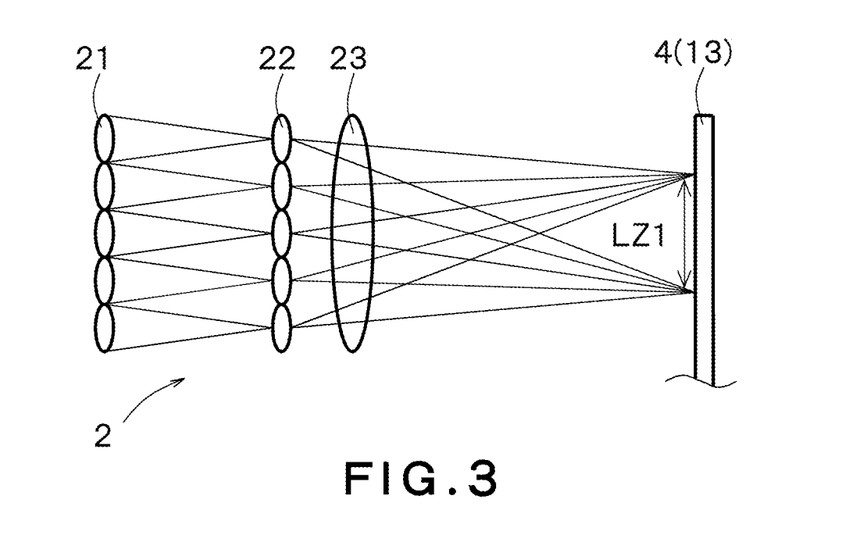
FIG. 3 is a diagram showing the detail of an optical device 2 according to the present embodiment.

FIG. 3 is a diagram showing the detail of the optical device 2 according to the present embodiment. The optical device 2 of FIG. 3 has a configuration in which a first lens array 21 and a second lens array 22, and a field lens 23 are aligned in order along the optical axis. The first lens array 21 has a plurality of element lenses arranged along a plane orthogonal to the optical axis. The plurality of element lenses have the same diameter and the same focal length. The second lens array 22 has a plurality of element lenses that are provided to be associated with the plurality of element lenses of the first lens array 21, respectively, arranged along a plane orthogonal to the optical axis. Each element lens of the second lens array 22 is disposed at a focal point of the associated element lens of the first lens array 21. With this arrangement, a light beam captured by each element lens of the first lens array 21 is imaged on the associated element lens of the second lens array 22.

A light beam that has transmitted each element lens of the second lens array 22 transmits the field lens 23 and then illuminates the first illumination zone LZ1 on the rotary wheel 13. As shown in FIG. 3, each element lens of the second lens array 22 illuminates the entire first illumination zone LZ1.

The optical scanning device 12 makes a coherent light beam scan on the first lens array 21. By the scanning, the incidence angle of a coherent light beam incident from each element lens in the first lens array 21 on the associated element lens in the second lens array 22 varies with time. Therefore, the incidence angle of an illumination light beam that illuminates the first illumination zone LZ1 on the rotary wheel 13 through the field lens 23 from the second lens array 22 also varies with time, so that speckles in the first illumination zone LZ1 become inconspicuous.

As described above, in the first embodiment, a coherent light beam having light intensity made uniform by the optical device 2 is incident on the rotary wheel 13. Therefore, it is not required to provide a light uniformizing means on the optical axis of the rotary wheel 13 at the rear side thereof, so that light utilization can be improved and the optical system can be simplified.

Moreover, in the optical device 2 of the present embodiment, a light intensity uniformizing process is performed by means of high light utilization efficiency, such as a hologram and a lens array, so that the loss of a coherent light beam on the optical axis of the rotary wheel 13 at the front side thereof can be restricted.

Furthermore, in the present embodiment, a coherent light beam is incident on the rotary wheel 13 in the state where speckles are inconspicuous by the optical scanning device 12 and the optical device 2, speckles become inconspicuous in first and second illumination zones without providing a diffusing member, such as frosted glass, to the rotary wheel 13. Therefore, since the rotary wheel 13 is provided with the transmission portion 15 to transmit an incident light beam as it is, light utilization efficiency can further be improved.

Second Embodiment

The example shown in the first embodiment described above is that a coherent light beam in the wavelength range of blue is only irradiated from the laser source 11. On the other hand, in a second embodiment described below, two kinds of coherent light beams in the wavelength ranges of blue and red are irradiated from the laser source 11.

Figure 4:
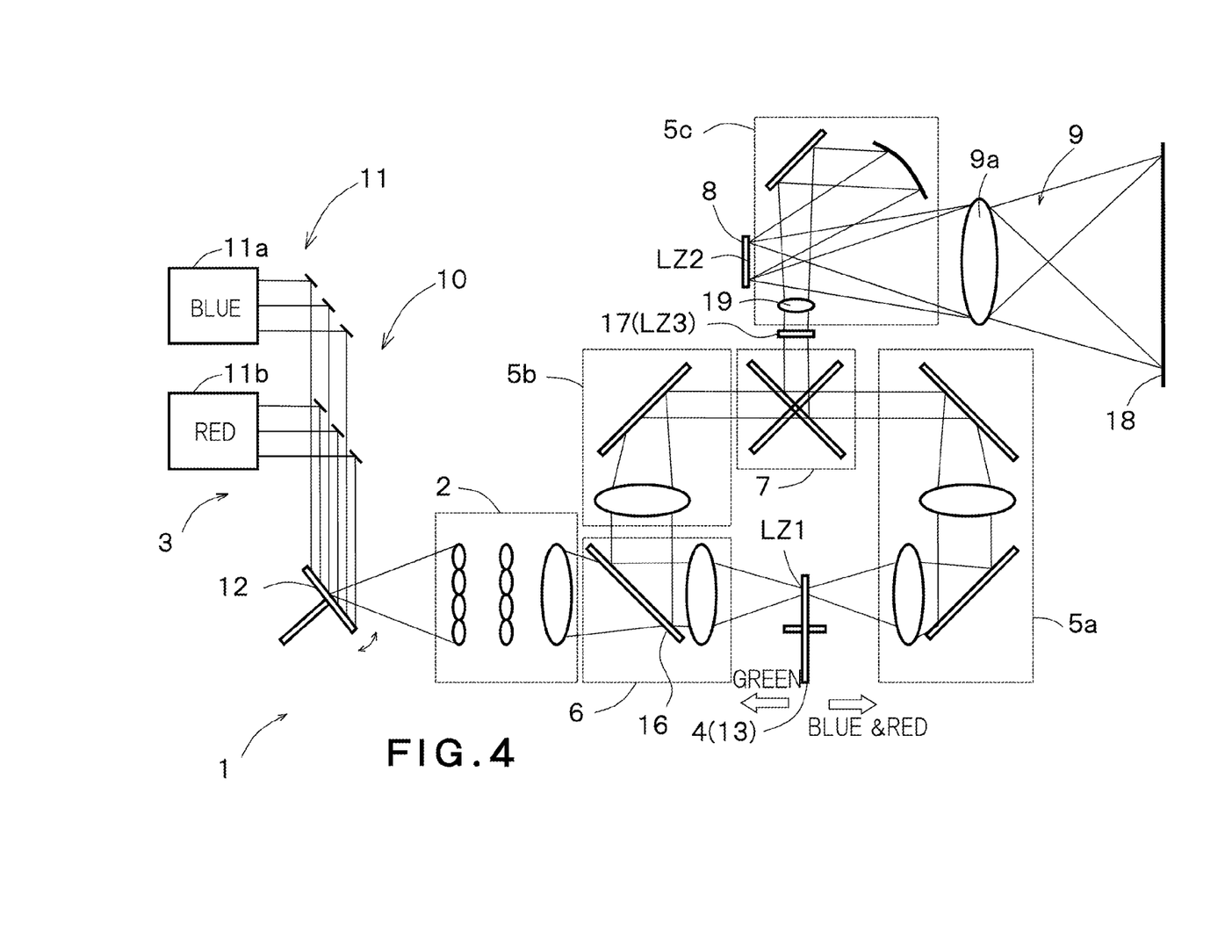
FIG. 4 is a diagram showing the configuration of an optical system of a projection apparatus 1 according to a second embodiment of the present disclosure.

FIG. 4 is a diagram showing the configuration of an optical system of a projection apparatus 1 according to the second embodiment of the present disclosure. The projection apparatus 1 of FIG. 4 has the same configuration as that of FIG. 1, except for the laser source 11. The laser source 11 of FIG. 4 has a first light source unit 11a that irradiates a coherent light beam in the wavelength range of blue and a second light source unit 11b that irradiates a coherent light beam in the wavelength range of red. The first light source unit 11a and the second light source unit 11b exclusively irradiate coherent light beams. In detail, while the first light source unit 11a is irradiating a blue coherent light beam, the second light source unit 11b stops irradiation, and while the second light source unit 11b is irradiating a red coherent light beam, the first light source unit 11a stops irradiation. Since the blue coherent light beam irradiated from the first light source unit 11a is utilized for generation of a green light beam at the rotary wheel 13, the period of time for the first light source unit 11a to irradiate a coherent light beam is set to be two times as long as the period of time for the second light source unit 11b to irradiate a coherent light beam.

These two kinds of coherent light beams are reflected by the optical scanning device 12 to scan on the optical device 2. And then, the optical device 2 diffuses the two kinds of coherent light beams alternately in a time division manner to illuminate the first illumination zone LZ1 on the rotary wheel 13.

Figure 5:
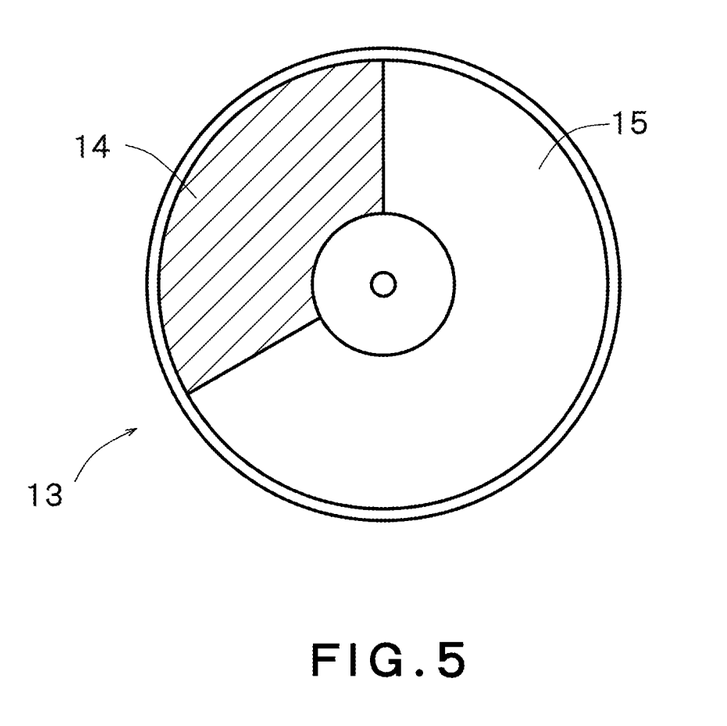
FIG. 5 is a plan view of a rotary wheel 13 according to the second embodiment.

The rotary wheel 13, which is a color generator 4, for example, as shown in FIG. 5, has a transmission portion 15 and one fluorescent portion 14 in the circumferential direction. The transmission portion 15 has an arc length two times as long as that of the fluorescent portion 14. The blue and red coherent light beams transmit the transmission portion 15 to be emitted therefrom and the green coherent light beam is generated by the fluorescent portion 14.

When the laser source 11 irradiates the blue coherent light beam, the illumination light beam to the first illumination zone LZ1 also becomes a blue coherent light beam that transmits the transmission portion 15 or is incident on the fluorescent portion 14, of the rotary wheel 13. When the blue coherent light beam is incident on the fluorescent portion 14, the fluorescent portion 14 is excited to generate a green light beam. The green light beam is reflected by the rotary wheel 13 and incident on the color composite optical system 7 via the second relay optical system 5b.

The blue and red coherent light beams that have transmitted the transmission portion 15 of the rotary wheel 13 are incident on the color composite optical system 7 via the first relay optical system 5a. The color composite optical system 7 combines the blue and red coherent light beams that have transmitted the first relay optical system 5a and the green coherent light beam that has transmitted the second relay optical system 5b to form an intermediate image 17 in the third illumination zone LZ3. Thereafter, in the same way as the first embodiment, the second illumination zone LZ2 is illuminated via the third relay optical system 5c.

As described above, in the second embodiment, the blue and red coherent light beams are irradiated from the first light source unit 11a and the second light source unit 11b, respectively, in a time division manner, and the green coherent light beam is generated by the rotary wheel 13. Therefore, a second illumination zone disposed to be overlap with the spatial light modulator 8 can be illuminated with three-color combined color.

Moreover, also in the second embodiment, after the light is uniformized by the optical device 2, the first illumination zone LZ1 on the rotary wheel 13 is illuminated, so that a light uniformizing means is not required on the optical axis of the rotary wheel 13 at the rear side thereof. Furthermore, since speckles are made inconspicuous by the optical scanning device 12 and the optical device 2, it is not required to perform an anti-speckle measure on the optical axis of the rotary wheel 13 at the rear side thereof, so that it is possible to make the configuration of the optical system of the projection apparatus 1 simplified.

Third Embodiment

In a third embodiment which will be described below, a coherent light beam generated by the fluorescent portion 14 of the rotary wheel 13 is not reflected by but transmitted the fluorescent portion 14.

Figure 6:
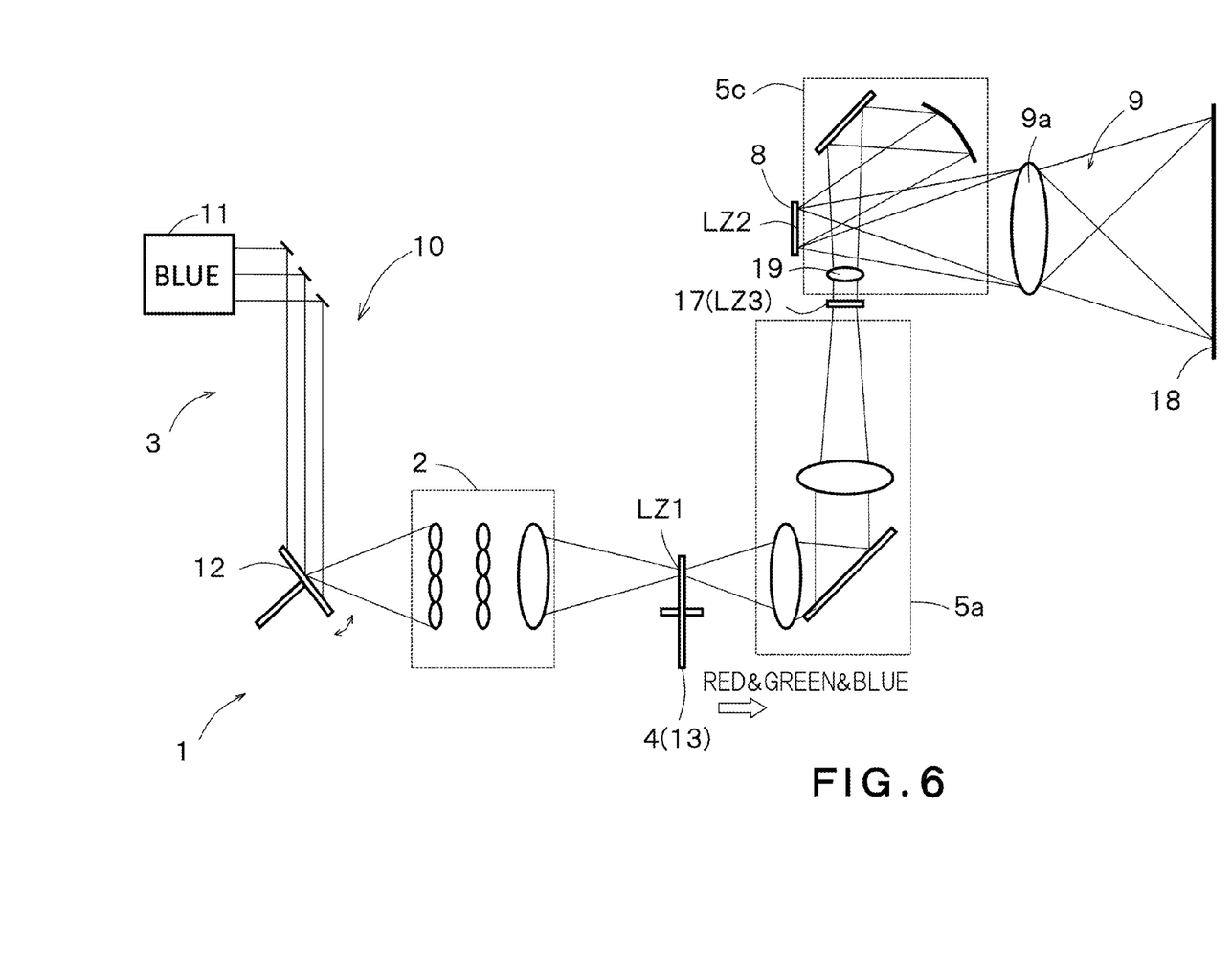
FIG. 6 is a diagram showing the configuration of an optical system of a projection apparatus 1 according to a third embodiment of the present disclosure.

FIG. 6 is a diagram showing the configuration of an optical system of a projection apparatus 1 according to the third embodiment of the present disclosure. The laser source 11 in the projection apparatus 1 of FIG. 6 irradiates a coherent light beam in the wavelength range of blue, in the same way as in FIG. 1. The rotary wheel 13 of FIG. 6 has a fluorescent portion 14 and a transmission portion 15, like in FIG. 2. However, the fluorescent portion 14 transmits a coherent light beam generated by excitation through the rotary wheel 13 in the same direction as from the transmission portion 15, to be output from the rotary wheel 13.

Figure 7:
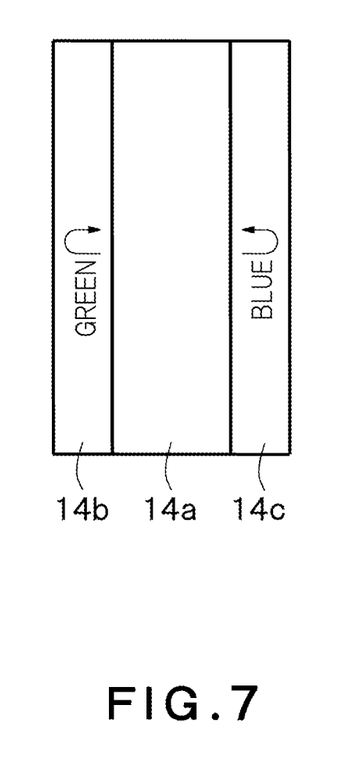
FIG. 7 is an illustration showing an example of the configuration of a fluorescent portion 14 in cross section.

FIG. 7 is an illustration showing an example of the configuration of the fluorescent portion 14 in cross section. As shown in FIG. 7, the fluorescent portion 14 has a layered structure of dielectric multilayer films 14b and 14c arranged on both sides of a fluorescent layer 14a. The fluorescent layer 14a is excited by a coherent light beam in the wavelength range of blue to generate a coherent light beam in the wavelength range of green. The dielectric multilayer film 14b located closer to the optical device 2 has a characteristic of reflecting a light beam in the wavelength range of green. The dielectric multilayer film 14c located closer to the first relay optical system 5a has a characteristic of reflecting a light beam in the wavelength range of blue. With these characteristics, the coherent light beam in the wavelength range of green generated by the fluorescent layer 14a transmits the dielectric multilayer film 14c and is incident on the first relay optical system 5a.

In the projection apparatus 1 of FIG. 6, light beams in the wavelength ranges of red, green, and blue transmit the rotary wheel 13 and are incident on the first relay optical system 5a. Therefore, the second relay optical system 5b and the color composite optical system 7 both required in FIGS. 1 and 4 are not required.

The first relay optical system 5a changes the travel directions of the light beams in the wavelength ranges of red, green, and blue in the same direction in a time division manner to generate an intermediate image 17, and generates an illumination light beam for illuminating the second illumination zone LZ2, via the third relay optical system 5c.

Also in the third embodiment, the intermediate image 17 may not be generated and the third relay optical system 5c may not be provided. The intermediate image 17 may be generated in the second illumination zone LZ2.

As described above, in the third embodiment, the light beam generated by the fluorescent portion 14 of the rotary wheel 13 is also transmitted through the rotary wheel 13 and is then incident on the first relay optical system 5a, so that the second relay optical system 5b is not required. It is therefore possible to make the configuration of the optical system of the projection apparatus 1 simpler than in the first and second embodiments.

Fourth Embodiment

A fourth embodiment which will be described below is a simpler version of the third embodiment, to illuminate the second illumination zone LZ without generating the intermediate image 17.

Figure 8:
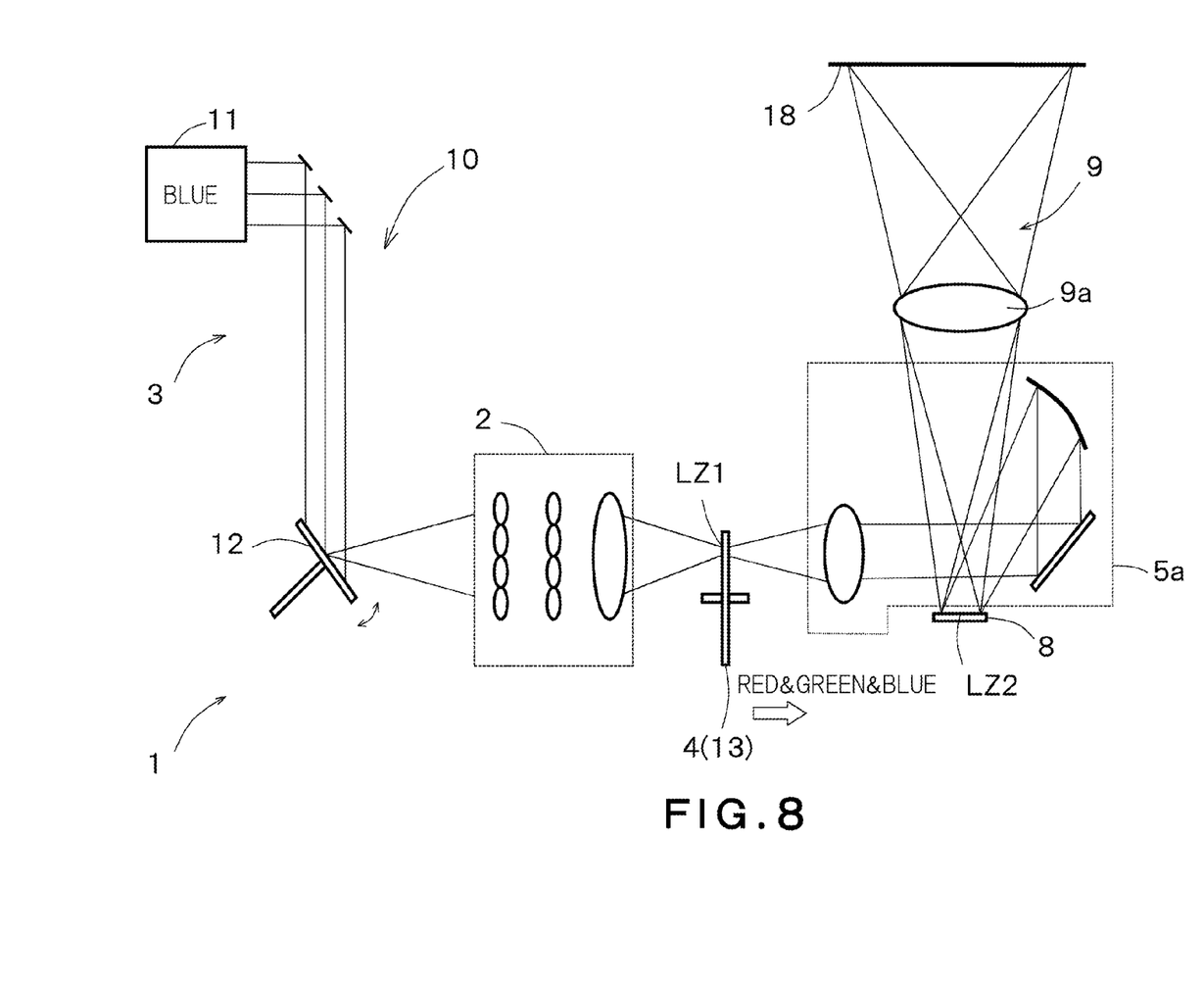
FIG. 8 is a diagram showing the configuration of an optical system of a projection apparatus 1 according to a fourth embodiment of the present disclosure.

FIG. 8 is a diagram showing the configuration of an optical system of a projection apparatus 1 according to the fourth embodiment of the present disclosure. In the projection apparatus 1 of FIG. 8, in the same way as in the third embodiment, coherent light beams in the wavelength ranges of red, green, and blue that have transmitted the rotary wheel 13 are incident on the first relay optical system 5a in a time division manner. The light beam that has transmitted the first relay optical system 5a directly illuminates the second illumination zone LZ2. The spatial light modulator 8 is provided on the position of the second illumination zone LZ2.

As described above, in the fourth embodiment, the light that has transmitted the first relay optical system 5a directly illuminates the second illumination zone LZ2. Therefore, the second relay optical system 5b and the third relay optical system 5c are not required, so that an intermediate image is not required to be generated, which makes the configuration of the optical system of the projection apparatus 1 simpler than in the third embodiment.

Fifth Embodiment

In a fifth embodiment which will be described below, the spatial light modulator 8 is separated for respective colors.

Figure 9:
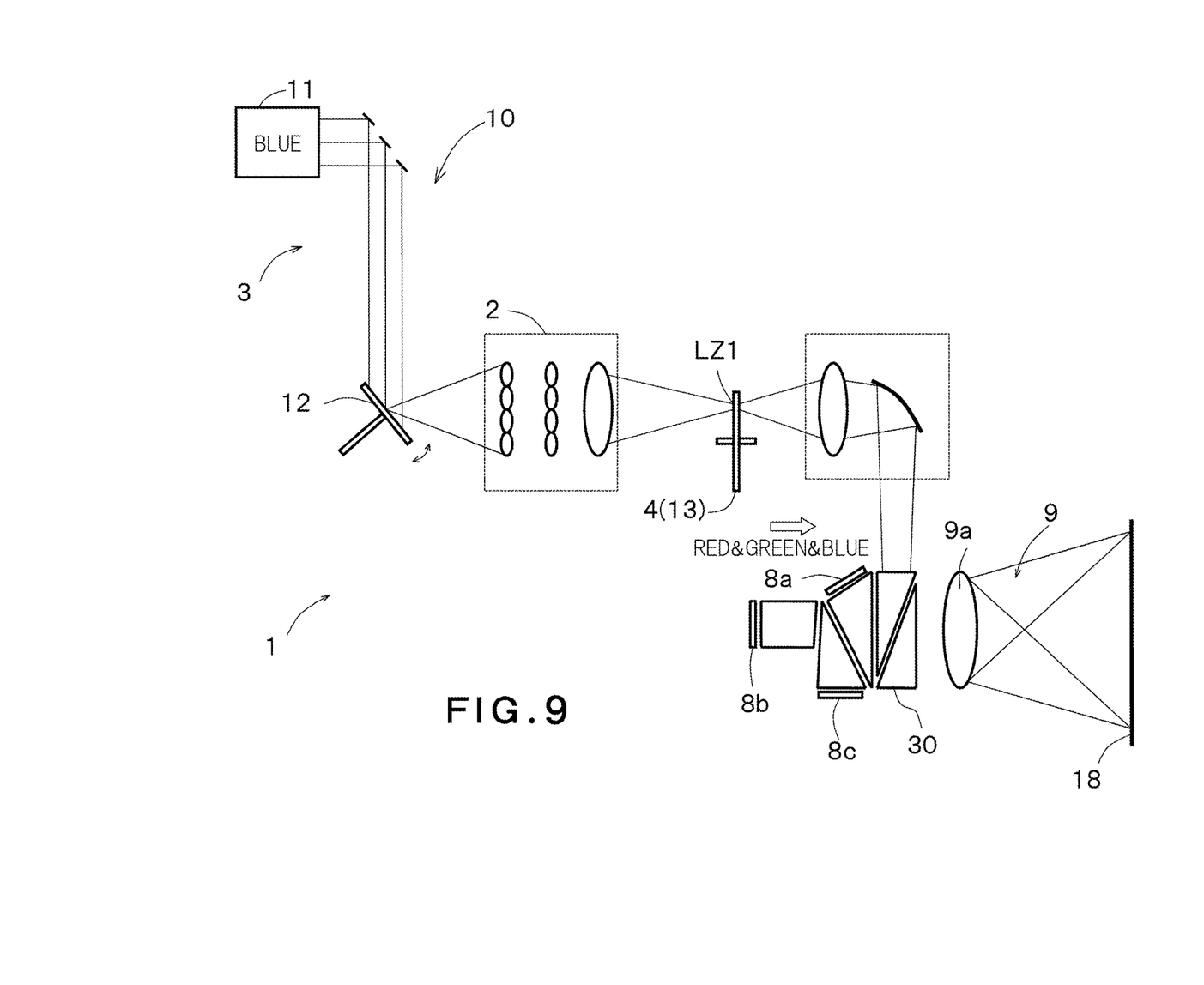
FIG. 9 is a diagram showing the configuration of an optical system of a projection apparatus 1 according to a fifth embodiment of the present disclosure.

FIG. 9 is a diagram showing the configuration of an optical system of a projection apparatus 1 according to the fifth embodiment of the present disclosure. The spatial light modulator 8 in the projection apparatus 1 of FIG. 9 has a spatial light modulator 8a for red, a spatial light modulator 8b for green, and a spatial light modulator 8c for blue. A light direction switch 30 for switching the light direction per color is provided between the three spatial light modulators 8a, 8b, and 8c, and the first relay optical system 5a. The light direction switch 30 is, for example, configured by combining a plurality of optical prisms.

The projection apparatus 1 of FIG. 9 is configured in the same manner as in FIG. 8 from the laser source 11 to the first relay optical system 5a. The light beam that has transmitted the first relay optical system 5a includes a light beam in the wavelength range of red, green or blue in the time division manner. The light that has transmitted the first relay optical system 5a is incident on the light direction switch 30, so that a red light beam illuminates the second illumination zone LZ2 disposed to overlap with the spatial light modulator 8 for red, a green light beam illuminates the second illumination zone LZ2 disposed to overlap with the spatial light modulator 8 for green, and a blue light beam illuminates the second illumination zone LZ2 disposed to overlap with the spatial light modulator 8 for blue. Modulated images generated by the three spatial light modulators 8 are incident on the projection optical system 9 in the state where the modulated images are combined one another via the light direction switch 30.

As described above, even in the case where different spatial light modulators 8 are provided for respective colors, by providing the light direction switch 30 on the optical axis of the first relay optical system 5a at the rear side thereof, illumination light beams for illuminating the respective spatial light modulators 8 can be generated.

Moreover, also in the third to fifth embodiments described above, after the light is uniformized by the optical device 2, the first illumination zone LZ1 on the rotary wheel 13 is illuminated, so that a light uniformizing means is not required on the optical axis of the rotary wheel 13 at the rear side thereof. Furthermore, since speckles are made inconspicuous by the optical scanning device 12 and the optical device 2, it is not required to perform an anti-speckle measure on the optical axis of the rotary wheel 13 at the rear side thereof, so that it is possible to make the configuration of the optical system of the projection apparatus 1 simplified.

The present disclosure is not limited to the embodiments described above but includes various modifications conceivable by those skilled in the art. The effects of the present disclosure are also not limited to those described above. Namely, various additions, modifications and partial omissions may be made without departing from the conceptual idea and gist of present disclosure derived from those defined in the accompanying claims and their equivalents.

The invention claimed is:

1. A projection apparatus comprising:
    an optical device to diffuse a coherent light beam;
    an irradiation unit to irradiate the coherent light beam to the optical device so that the coherent light beam scans on the optical device;
    a color generator to perform wavelength conversion of and transmission of light beams in a first illumination zone illuminated with the coherent light beam diffused by the optical device, in a time division manner;
    at least one relay optical system to change a travel direction of a light beam wavelength-converted by the color generator and a travel direction of a light beam that has transmitted the color generator to generate an illumination light beam which illuminates a second illumination zone;
    a spatial light modulator to generate a modulated image based on the illumination light beam to the second illumination zone; and
    a projection optical system to project the modulated image generated by the spatial light modulator onto a diffusing plane,
    wherein the first illumination zone and the second illumination zone have a conjugate relationship with each other, and
    the color generator comprises:
    a fluorescent portion to be excited by the coherent light beam diffused by the optical device to generate a light beam in a wavelength range different from a wavelength range of the light beam diffused by the optical device; and
    a transmission portion to transmit the coherent light beam diffused by the optical device, without diffusing the coherent light beam diffused by the optical device,
    wherein the color generator cyclically switches whether the coherent light beam diffused by the optical device is incident on the fluorescent portion or on the transmission portion.

2. The projection apparatus of claim 1, wherein the color generator reflects the light beam that the fluorescent portion has generated by wavelength conversion in a direction of the optical device, further comprising:
    a color separation optical system provided in an optical path between the optical device and the color generator, to guide the coherent light beam diffused by the optical device to the color generator and to guide a light beam reflected by the fluorescent portion in a direction different from the direction of the optical device.

3. The projection apparatus of claim 1, wherein the color generator transmits the light beam that the fluorescent portion has generated by wavelength conversion to be incident on the relay optical system, together with a light beam that has transmitted the transmission portion.

4. The projection apparatus of claim 1, wherein the color generator is a rotary member rotatable about a rotation axis, the rotary member having the fluorescent portion and the transmission portion arranged in a circumferential direction.

5. The projection apparatus of claim 1, wherein the irradiation unit irradiates the coherent light beam in a single wavelength range to the optical device,
    wherein the fluorescent portion is excited by the coherent light beam diffused by the optical device to generate light beams in two different kinds of wavelength ranges.

6. The projection apparatus of claim 1, wherein the irradiation unit irradiates two kinds of coherent light beams in different wavelength ranges to the optical device,
    wherein the fluorescent portion is excited by one of the two kinds of coherent light beams to generate a light beam in a wavelength range different from the wavelength ranges of the two kinds of coherent light beams.

7. The projection apparatus of claim 1, wherein, based on a light beam wavelength-converted by the color generator and a light beam that has transmitted the color generator, the relay optical system generates a third illumination zone in an optical path between the first illumination zone and the second illumination zone and changes a travel direction of an illumination light beam to the third illumination zone to generate an illumination light beam to the second illumination zone.

8. The projection apparatus of claim 7, further comprising a color composite optical system to combine the light beam wavelength-converted by the color generator and the light beam that has transmitted the color generator to generate an illumination light beam to the third illumination zone.

9. The projection apparatus of claim 1, wherein the spatial light modulator comprises a plurality of spatial light modulating units to generate different modulated images by using light beams in different wavelength ranges,
   wherein the relay optical system illuminates a plurality of the second illumination zones associated with the plurality of spatial light modulating units, respectively.

10. An illumination apparatus comprising:
   an optical device to diffuse a coherent light beam;
   an irradiation unit to irradiate the coherent light beam to the optical device so that the coherent light beam scans on the optical device;
   a color generator to perform wavelength conversion of and transmission of a light beam in a first illumination zone illuminated with the coherent light beam diffused by the optical device, in a time division manner; and
   at least one relay optical system to change a travel direction of a light beam wavelength-converted by the color generator and a travel direction of a light beam that has transmitted the color generator to generate an illumination light beam which illuminates a second illumination zone;
   wherein the first illumination zone and the second illumination zone have a conjugate relationship with each other, and
   the color generator comprises:
   a fluorescent portion to be excited by the coherent light beam diffused by the optical device to generate a light beam in a wavelength range different from a wavelength range of the light beam diffused by the optical device; and
   a transmission portion to transmit the coherent light beam diffused by the optical device, without diffusing the coherent light beam diffused by the optical device,
   wherein the color generator cyclically switches whether the coherent light beam diffused by the optical device is incident on the fluorescent portion or on the transmission portion.

\* \* \* \* \*